United States Patent [19]

Siwersson et al.

[11] Patent Number: 4,467,910

[45] Date of Patent: Aug. 28, 1984

[54] VERTICAL CONVEYOR FOR BULK GOODS

[75] Inventors: Olle L. Siwersson, Helsingborg; Arne E. Wall, Landskrona, both of Sweden

[73] Assignee: AB Scaniainventor, Helsingborg, Sweden

[21] Appl. No.: 323,796

[22] Filed: Nov. 23, 1981

[30] Foreign Application Priority Data

Nov. 28, 1980 [SE] Sweden ............................ 8008347

[51] Int. Cl.³ .............................................. B65G 65/16
[52] U.S. Cl. ..................................... 198/518; 198/658; 198/671
[58] Field of Search ............... 198/518, 612, 608, 657, 198/658, 662, 511, 513, 671; 414/144

[56] References Cited

U.S. PATENT DOCUMENTS

| 508,337 | 11/1893 | Penfield | 198/662 |
| 1,300,620 | 4/1919 | Joy | 198/513 |
| 3,152,683 | 10/1964 | Carrier | 198/612 |
| 3,596,751 | 8/1971 | Siwersson et al. | 198/608 |
| 3,685,638 | 8/1972 | Siwersson et al. | 198/608 |
| 4,017,241 | 4/1977 | Papinchak et al. | 198/657 |
| 4,230,221 | 10/1980 | Beresinsky | 198/518 |

FOREIGN PATENT DOCUMENTS 1034480 7/1953 France ............................... 198/658

Primary Examiner—Joseph E. Valenza
Assistant Examiner—Jonathan D. Holmes
Attorney, Agent, or Firm—Karl W. Flocks; Sheridan Neimark; A. Fred Starobin

[57] ABSTRACT

Use is made of a screw conveyor to supply and guide bulk material to a belt conveyor of the type having two belts which travel in face-to-face relationship and between which the bulk material is enclosed during conveyance. The screw of the screw conveyor may be rigidly connected to the frame of the belt conveyor and may have its upper end in immediate proximity to the entrance end of the belt conveyor. The tubular outer housing of the screw conveyor is preferably rotatably mounted for rotation about the screw. A material supplying device is provided at the entrance opening of the screw conveyor.

7 Claims, 10 Drawing Figures

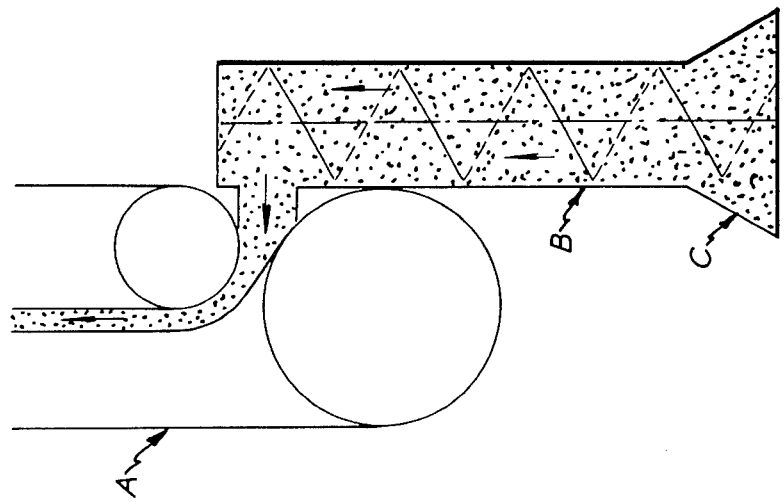
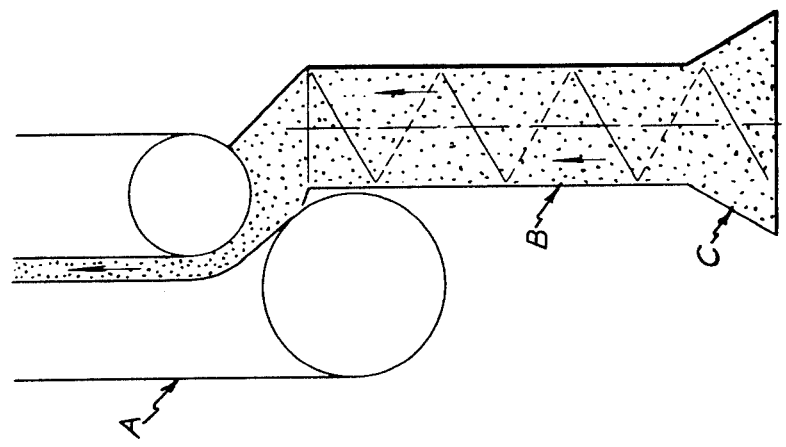
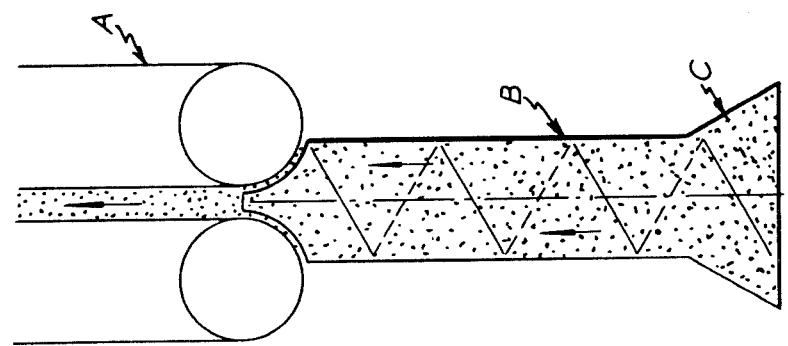

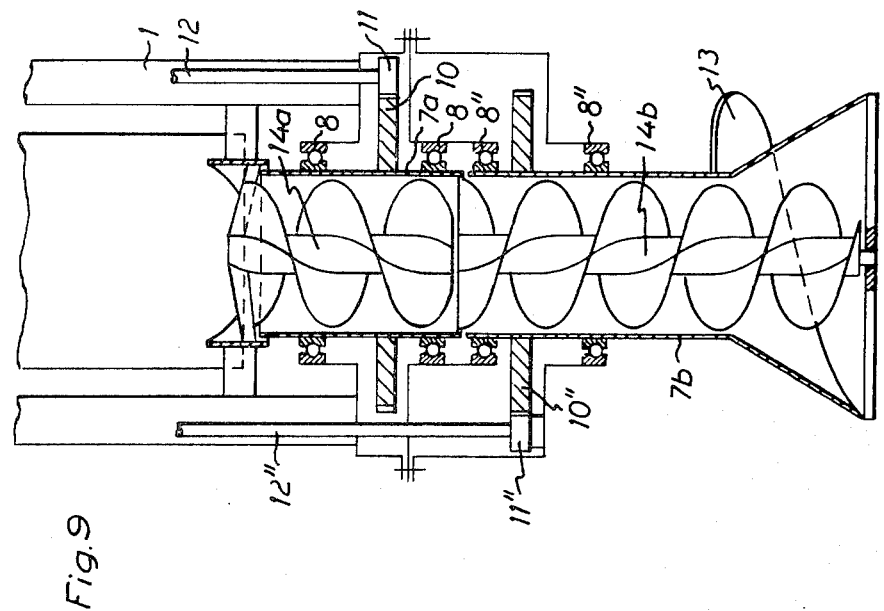
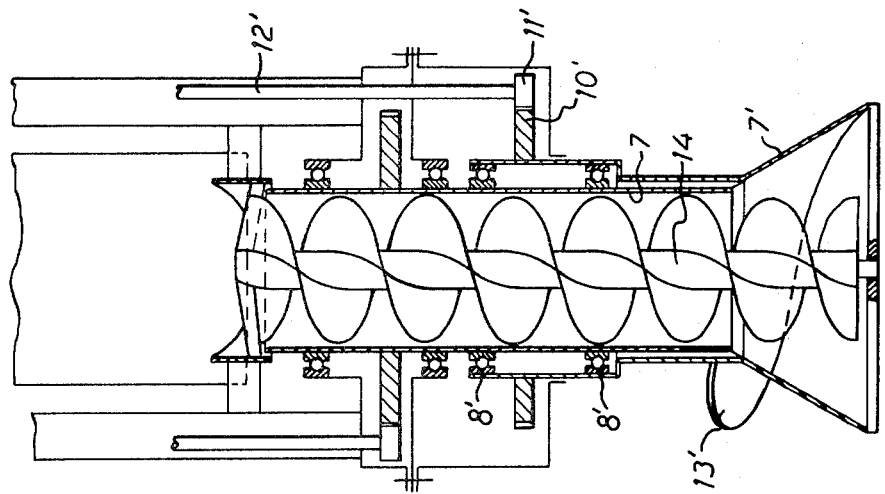

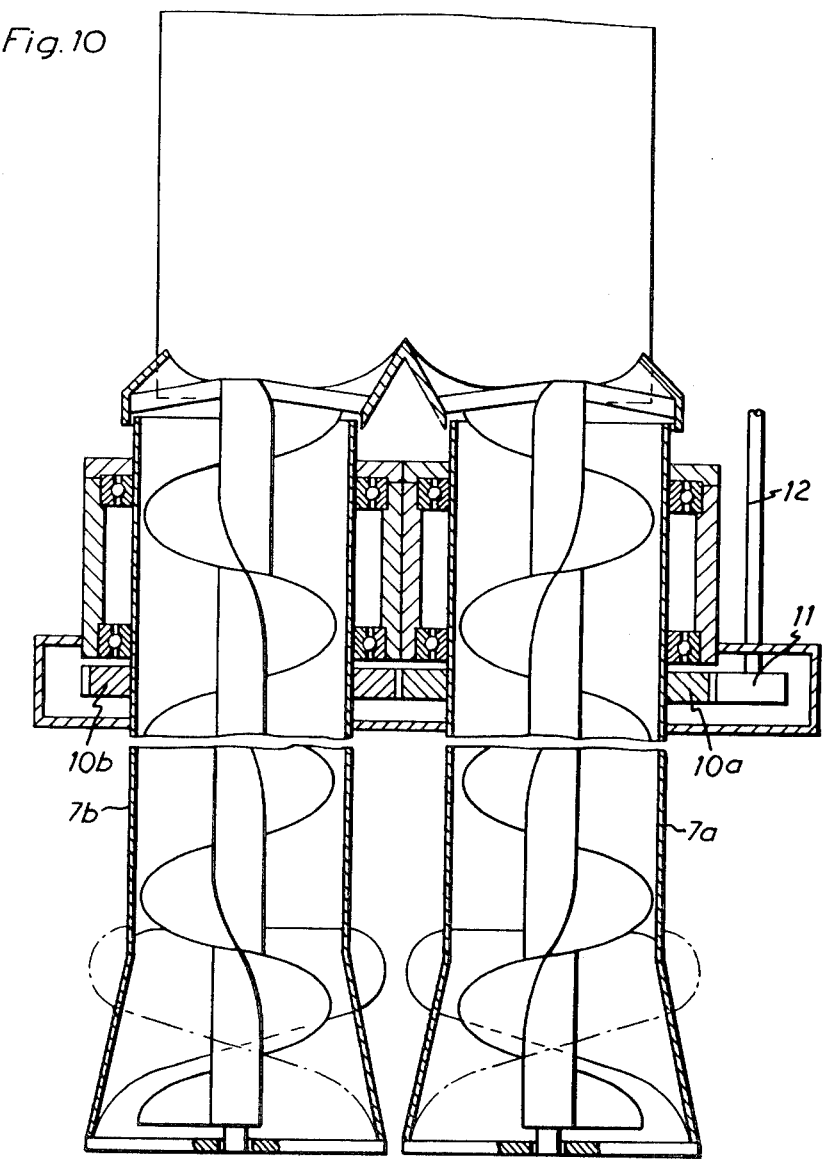

VERTICAL CONVEYOR FOR BULK GOODS

BACKGROUND OF THE INVENTION

This invention relates generally to conveyors for bulk material and more particularly to a conveyor of this type which comprises a belt conveyor having two belts which travel in face-to-face relationship and between which the bulk material is conveyed in an upward direction from an entrance end at a lower portion of the belt conveyor.

Conveyors having double conveyor belts which over at least part of their extension are in face-to-face relationship and travel in unison, are advantageous for providing rapid and closed conveyance of bulk material over conveyance paths of both vertical and horizontal extension. This type of belt conveyors is disclosed for instance in U.S. Pat. Nos. 3,319,776 to G. Bechtloff et al and 3,618,746 to P. D. Suloff. In the belt conveyors described and shown in these patent specifications the material is supplied to a horizontal section of one belt. As a result, the arrangement will necessarily be relatively bulky at the point of supply, for which reason a belt conveyor of such a design is not suited as a vertical conveyor, especially not in narrow premises.

Further, it is previously known from U.S. Pat. No. 4,230,221 to Isaac Beresinki to use for the supply of bulk material to a vertical belt conveyor a vane wheel which throws the material in between the belts of the belt conveyor. Said vane wheel does not operate directly in the bulk material depot, from which vertical conveyance is to be effected, but receives the bulk material either directly from a horizontally extending screw conveyor or via a vertically extending screw conveyor which delivers the bulk material to a bin from where the vane wheel throws it into the entrance end of the belt conveyor. In these cases also the conveyor requires relatively ample room at the entrance end and moreover the material changes its direction of motion at the entrance point. In the case of a horizontal screw conveyor the motional pattern of the entrance end is restricted to directions transversely of the longitudinal axis of the screw conveyor.

For the conveyance of bulk material from narrow premises it would be desirable if the material could be supplied directly to a downwardly directed end of a belt conveyor of the above-mentioned type, which necessitates that the flow of material is moved with a certain force up to the belt conveyor end for further upward conveyance.

SUMMARY

The main object of the present invention therefore is to provide a conveyor of the type described in the introduction, which produces a rapid supply of the material, is compact and movable in all directions for supplying material from optional sides.

This and further objects of the invention are attained by means of a bulk material conveyor which comprises a belt conveyor having two belts which travel in face-to-face relationship and between which the bulk material is conveyed in an upward direction from an entrance end at a lower portion of the belt conveyor, said bulk material conveyor having a downwardly directed screw conveyor which is fixedly mounted at the lower portion of the belt conveyor and the delivery opening of which connects directly onto the entrance end between said belts while the entrance opening of the screw conveyor is equipped with a material supplying device.

The invention thus provides a bulk material conveyor which is extremely compact, permits supply of material from optional sides and is movable in all directions. The use of a screw conveyor having a material supplying device allows a high supplying speed for the bulk material from the bulk material depot to the belt conveyor in that the screw conveyor can operate at a high rpm and with a high volumetric efficiency. The direct coupling between the screw conveyor and the belt conveyor brings the advantage that the direction of motion of the material need not essentially be changed when the material passes from the screw conveyor to the belt conveyor. The screw conveyor makes it also possible to deliver the bulk material in a concentrated stream which can be supplied to the centre between the belts of the belt conveyor so that the marginal portions of the belts will be free of the conveyed material.

BRIEF DESCRIPTION OF THE DRAWINGS

FIGS. 1, 2 and 3 illustrate the principle of the invention in three different embodiments;

FIGS. 6–10 diagrammatically show longitudinal sections of other embodiments of the conveyor according to the invention.

DESCRIPTION OF THE PREFERRED EMBODIMENTS

Figure 4:
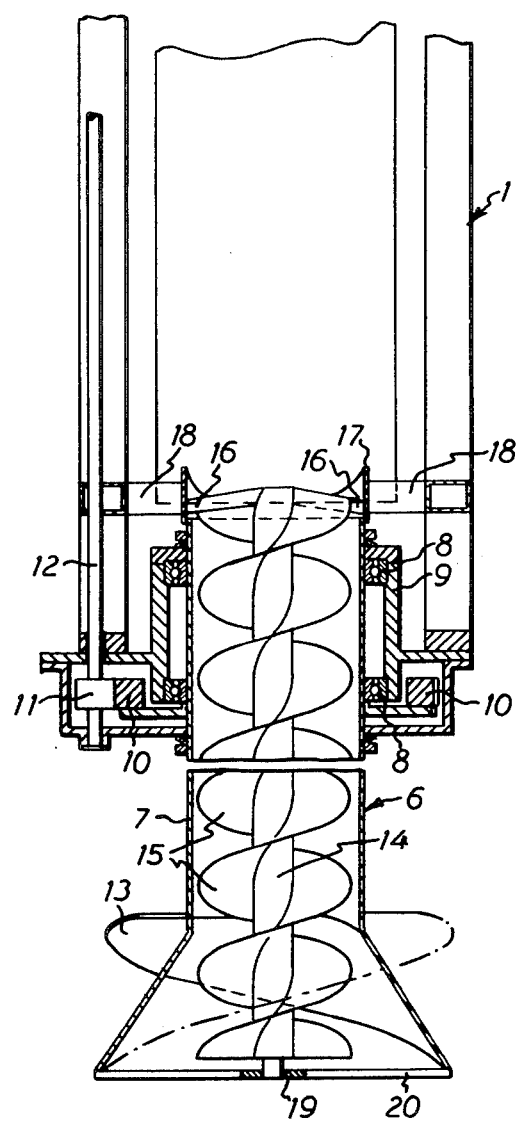
FIGS. 4 and 5 diagrammatically show longitudinal sections, taken at right angles to each other, of a preferred embodiment of a vertical conveyor according to the invention.

As diagrammatically shown in FIGS. 1, 2 and 3, a bulk material conveyor according to the present invention comprises a belt conveyor A having two belts travelling in face-to-face relationship, and a vertically arranged screw conveyor assembly B which at the lower end is equipped with a material supplying device C. At the lower end or entrance end of the belt conveyor A the belts thereof are passed about two drums which according to FIG. 1 may be placed on the same level, according to FIG. 2 may be placed obliquely over one another, and according to FIG. 3 may be placed substantially vertically over one another. For realizing the direct coupling, aimed at by the invention, between the screw conveyor B and the belt conveyor A, the screw conveyor B is mounted in the embodiment according to FIG. 1 vertically below the belt conveyor A and centrally in relation thereto. In the case of FIG. 2 the axis of the screw conveyor is laterally offset relative to the axis of the belt conveyor A. The axis of the screw conveyor B may here lie altogether outside the belt conveyor A so that an upwardly directed drive shaft of the screw conveyor B goes free of the belt conveyor A. In the embodiment according to FIG. 3 the flow of material is led substantially horizontally outwards from the delivery opening of the screw conveyor into the entrance opening of the belt conveyor A, which opening is arranged substantially at a right angle to the flow of material.

For a meaningful combination of the belt conveyor A and the screw conveyor B it is required that the conveying capacity of the screw conveyor reasonably corresponds to that of the belt conveyor. This in turn requires that the screw conveyor B operates with a high volumetric efficiency, for which reason some form of device C for supplying material to the screw conveyor B is necessary. Material supplying devices of the type described in U.S. Pat. Nos. 3,596,751 and 3,685,638 (both to O. L. Siwersson and K. G. Tell), are preferred. Said patents are hereby incorporated by reference.

When the screw conveyor B and belt conveyor A are coupled together, due attention should be paid to the motional pattern of the material in the screw conveyor B. The screw of said conveyor B imparts to the material an upward-outward movement which has axial, radial and tangential components. In view hereof, the embodiment according to FIG. 2 will give the smallest losses as a result of the change of direction of the flow of material at the transition from the screw conveyor B to the belt conveyor A. In the embodiment according to FIG. 3 the screw conveyor B should be placed slightly offset to the central plane of the lower drums of the belt conveyor A. In all of these embodiments the belt conveyor A can also to advantage be combined with two screw conveyors B each of which is placed on one side of said central plane and in which the flow of material has opposite directions of rotation so that the bulk material is supplied in the centre between the belts of the belt conveyor A.

A specially preferred embodiment of the construction diagrammatically shown in FIG. 1 will now be more fully described hereinbelow.

Figure 5:
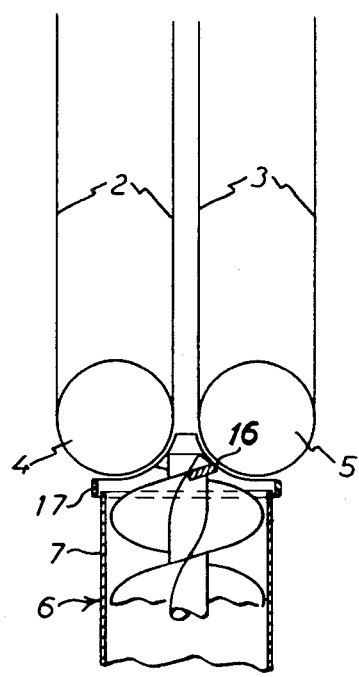

FIGS. 4 and 5 show the lower part of a frame 1 for a vertically extending belt conveyor having two belts 2, 3. The upper portion of the frame 1 may be suspended in substantially the same manner as the vertical conveyor in Swedish Pat. No. 377,099 and the belt conveyor may have a substantially horizontal extending section or be connected to a separate horizontal conveyor. The belt conveyor is of the type having two belts 2, 3 which travel in face-to-face relationship and between which bulk material can be conveyed and kept enclosed in per se known manner. The entrance end of the belt conveyor is the gap between two drums 4, 5 which are mounted for rotation in the frame 1 and over which pass the belts 2 and 3.

A screw conveyor 6 is mounted in the frame 1 immediately beneath the drums 4, 5 of the belt conveyor to serve as a means for guiding or supplying bulk material between the two conveyor belts 2 and 3. More particularly, the housing 7 of the conveyor 6 is rotatably mounted in bearings 8 in a bearing housing 9 which is secured to the lower end of the frame 1. Beneath the bearings 8 there is fixedly mounted a gear rim 10 which is in mesh with a pinion 11 on a drive shaft 12 which extends in an upward direction along the belt conveyor and is driven by a motor (not shown) spaced from the entrance end of the belt conveyor. At the lower end the screw conveyor housing 7 has an external guide surface 13 which rotates together with the housing and is formed as a helically or spirally coiled vane which is adapted to guide or supply material towards the entrance end of the screw conveyor. The screw 14 of the screw conveyor which in the embodiment illustrated in the drawing has two screw coils or threads 15, is rigidly connected to the frame 1 of the belt conveyor by means of inner transverse bars 16 connecting the screw 14 to a guide ring 17, and outer transverse bars 18 connecting the guide ring 17 to the frame 1. The transverse bars 16 are arranged in an oblique position beneath the coils 15 of the screw 14 and prolonged outwardly from the coils to the guide ring 17 to which they are rigidly connected. The guide ring 17 is a cylindrical sleeve the lower end edge of which connects onto the tubular housing 7 of the screw conveyor 6, while the upper edge of said sleeve has a shape conforming to that of the belts 2, 3 on the belt drums 4 and 5 situated immediately above the guide ring 17. The upper end edges of the screw coils 15 of the screw 14 are also of a shape conforming to that of the peripheral surface of the belt drums 4 and 5. The screw 14 and the housing 7 are rotatably interconnected by means of a bearing 19 arranged in one or two transverse beams 20 fixedly connected to the lower end of the housing 7.

The screw conveyor 6 illustrated in the drawing has a screw 14 with two screw coils 15 and, axially seen, the axis of the screw 14 is arranged centrally between the lower deviating drums 4, 5 of the belt conveyor. Naturally, a screw having a single screw coil is also useful, in which case the conveyor screw is preferably arranged laterally axially offset relative to the lower deviating drums 4, 5 of the belt conveyor.

With the use of the arrangement according to the invention, the delivery end of the screw conveyor 6 can be disposed in immediate proximity to the entrance end of the belt conveyor, thereby making it possible to give the material delivered by the screw conveyor sufficient energy of motion to have it caught between the two facing belts 2, 3 in the gap between the deviating drums 4 and 5. The arrangement according to the invention is constructionally simple and provides a vertical conveyor which requires insignificant room and which, as mentioned in the foregoing, can be disposed on the lower end of a crane arm in the same way as the conveyor according to Swedish Pat. No. 377,099. The attributes "vertical" and "horizontal" employed in the foregoing must of course not be considered to exclude positions or conveying directions which are offset from the vertical and the horizontal, respectively.

A great many modifications of the above-described conveyor apparatus are conceivable within the scope of the invention.

Figure 6:
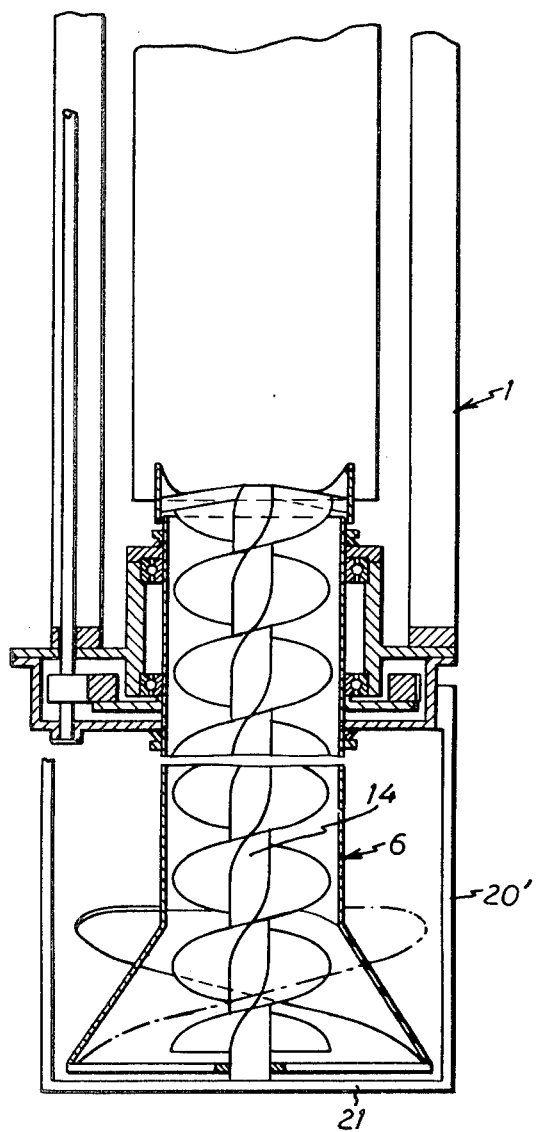

As illustrated in FIG. 6, the screw 14 of the screw conveyor 6 may thus be connected to the frame 1 by means of a structure 20' which has an upper portion fixedly connected to the frame 1 and a lower beam 21 which is fixedly connected to the lower end of the screw 14. In this embodiment the outer transverse bars 18 are lacking, but it is also possible to mount the screw 14 on the frame 1 by means of both the structure 20' and the bars 18.

Figure 7:
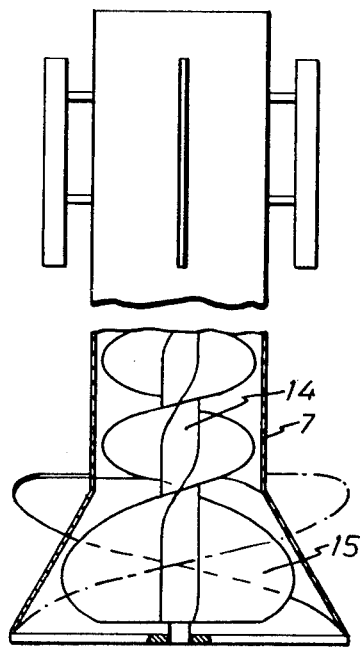

FIG. 7 illustrates an alternative embodiment of the lower portion of the coils 15 of the screw 14, in which embodiment the coil diameter increases in connection with the conically widened lower end of the housing 7. FIG. 7 also shows tearing means which are mounted concentrically on the screw conveyor above the material supplying device thereof. These tearing means consist of knives secured to the screw conveyor housing.

In the embodiment shown in FIG. 8 the guide surface 13' functioning as a material supplying device is mounted on a tubular housing 7' of its own, which extends upwardly around the lower portion of the housing 7 and is rotatable about the housing by means of bearings 8'. A gear rim 10' extends about the periphery of the housing 7' and is in mesh with a pinion 11' on a shaft 12' which extends in an upward direction along the belt conveyor and is driven by a motor (not shown) spaced from the entrance end of the belt conveyor. In the embodiment according to FIG. 8 the speed and direction of rotation of the material supplying device 13' of the screw conveyor can thus be controlled fully independently of the direction and speed of rotation of the housing 7.

In the embodiment illustrated in FIG. 9 the screw is divided into two separate screw sections 14a and 14b and the housing is likewise divided into two separate portions 7a and 7b. The upper screw section 14a is fixedly connected to the frame 1, while the lower screw section 14b is fixedly connected with the upper housing portion 7a which is rotatably supported in the bearings 8 and rotatable by a motor (not shown) over the gear rim 10, the pinion 11 and the shaft 12. The lower housing portion 7b finally is rotatably supported in bearings 8'' and provided with a gear rim 10'' which over a pinion 11' and a shaft 12' is driven by a motor (not shown) for rotation of the housing portion 7b. The screw section 14a is thus stationary, while the screw section 14b rotates together with the upper housing portion 7a. In order that the direction of conveyance in the screw conveyor shall be the same both in the upper portion and in the lower portion thereof the screw coils are of opposite pitch in the two screw sections 14a, 14b. Thus, this embodiment also permits separate control of the material supplying device of the screw conveyor, i.e. the guide surface 13.

FIG. 10 digrammatically shows an example of the embodiment according to FIG. 1, having double screw conveyors. Meshing gear rims 10a, 10b on the housings 7a, 7b of the two screw conveyors automatically give the desired opposite directions of rotation for the flows of material in the two screw conveyors. As in the preceding embodiments use is made of a pinion 11 and a drive shaft 12 for movement transmission from a drive motor.

It should finally be emphasized that the invention is not limited to any particular type of belt conveyor belts.

What we claim and desire to secure by Letters Patent is:

1. A bulk material conveyor comprising a belt conveyor having two belts which are in face-to-face relationship and between which the bulk material is conveyed in an upward direction from an entrance end at a lower portion of said belt conveyor, a downwardly directed screw conveyor fixedly mounted on the lower portion of said belt conveyor, said screw conveyor having its delivery opening directly connected onto the entrance end between said belts, a material supplying device at the entrance opening of said screw conveyor, a screw of said screw conveyor is rigidly connected to a frame of said belt conveyor and stationary, and wherein a housing of said screw conveyor is rotatably mounted for rotation about said screw, said housing of said screw conveyor connected to an annular gear rim with which a pinion meshes, said pinion being driven by a motor spaced from the entrance end.

2. Conveyor as claimed in claim 1, wherein said screw conveyor is mounted as an extension of said belt conveyor substantially in parallel with the lower portion thereof.

3. Conveyor as claimed in claim 1, wherein said belt conveyor has an entrance opening between said belts at right angles to the conveying direction of the bulk material from the entrance end of said belt conveyor.

4. Conveyor as claimed in claim 1, wherein said pinion is coupled to a shaft which extends in an upward direction along said belt conveyor and is driven by said motor.

5. A bulk material conveyor comprising a belt conveyor having two belts which are in face-to-face relationship and between which the bulk material is conveyed in an upward direction from an entrance end at a lower portion of said belt conveyor, a downwardly directed screw conveyor fixedly mounted on the lower portion of said belt conveyor, said screw conveyor having its delivery opening directly connected onto the entrance end between said belts, a material supplying device at the entrance opening of said screw conveyor, a screw of said screw conveyor rigidly connected to a frame of said belt conveyor and stationary, and wherein a housing of said screw conveyor is rotatably mounted for rotation about said screw, said housing having an upper portion and a lower portion rotatable relative to said upper portion, said screw having a stationary upper section and a lower section rotatable relative to said upper section and a lower section rotatable relative to said upper section and fixedly coupled to an upper portion of said housing, and wherein a lower portion of said housing supports said material supplying device.

6. Conveyor as claimed in claim 5 wherein said screw conveyor is mounted as an extension of said belt conveyor substantially in parallel with the lower portion thereof.

7. Conveyor as claimed in claim 5, wherein said belt conveyor has an entrance opening between said belts at right angles to the conveying direction of the bulk material from the entrance end of said belt conveyor.

* * * * *